US011954458B2

(12) United States Patent
Joshi et al.

(10) Patent No.: US 11,954,458 B2
(45) Date of Patent: Apr. 9, 2024

(54) DECISION LOGIC TRANSLATION SYSTEM AND METHOD

(71) Applicant: Accenture Global Solutions Limited, Dublin (IE)

(72) Inventors: Suma S. Joshi, Bengaluru (IN); Subhashini LakshmiNarayanan, Chennai (IN); Shantanu Shirish Sahasrabudhe, Mumbai (IN); Rajashree Chandrashekar, Bangalore (IN); Gopali Raval Contractor, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 154 days.

(21) Appl. No.: 17/729,983

(22) Filed: Apr. 26, 2022

(65) Prior Publication Data

US 2023/0342114 A1 Oct. 26, 2023

(51) Int. Cl.
*G06F 8/10* (2018.01)
*G06F 8/41* (2018.01)

(52) U.S. Cl.
CPC .............. *G06F 8/10* (2013.01); *G06F 8/427* (2013.01); *G06F 8/433* (2013.01); *G06F 8/436* (2013.01)

(58) Field of Classification Search
CPC ........................................................ G06F 8/10
USPC ........................................................ 717/101
See application file for complete search history.

(56) References Cited

U.S. PATENT DOCUMENTS

| 7,689,442 B2 * | 3/2010 | Childress | ............... | G06Q 40/08 |
| | | | | 704/2 |
| 8,196,126 B2 * | 6/2012 | Ziegler | .............. | G06Q 30/0244 |
| | | | | 717/121 |
| 8,689,175 B2 * | 4/2014 | Matsumoto | ............ | G06N 5/025 |
| | | | | 717/109 |

(Continued)

FOREIGN PATENT DOCUMENTS

| AU | 2016202201 B2 * | 7/2017 | ............. | C12N 15/70 |
| CN | 107797823 A * | 3/2018 | ........... | G06F 16/258 |

(Continued)

OTHER PUBLICATIONS

NPL-CN Patent Documents (N, O, P, Q and R) English Translation.*

(Continued)

*Primary Examiner* — Francisco J Aponte
(74) *Attorney, Agent, or Firm* — Plumsea Law Group, LLC

(57) ABSTRACT

An automated system and method of converting legacy decision logic to a target format. The legacy files are received by the decision logic translation system, which outputs the business rule content in a standard rule structure, according to the selected target format. The process involves decision logic-based rule extraction. In general, methods or processes for extracting business rules have been difficult to reproduce and do not present clearly the extracted rules regarding the concepts of business rules, their composition and categorization. These drawbacks lead to incomplete extraction of rules and massive manual effort to achieve a complete extraction and verification. In contrast, the proposed system overcomes these drawbacks, and outputs files that can be easily used to migrate the business rules to a new platform.

20 Claims, 9 Drawing Sheets

(56) References Cited

U.S. PATENT DOCUMENTS

| | | | | |
|---|---|---|---|---|
| 8,954,371 | B2* | 2/2015 | Dresdner | G06N 5/025 |
| | | | | 706/47 |
| 9,412,071 | B2* | 8/2016 | Burris | G06N 5/027 |
| 9,589,232 | B2* | 3/2017 | Gould | G06N 5/04 |
| 9,830,135 | B2* | 11/2017 | Tripathi | G06F 9/44505 |
| 9,875,098 | B2* | 1/2018 | Mehalingam | G06Q 10/10 |
| 9,959,502 | B2* | 5/2018 | Flores | G06Q 10/067 |
| 10,019,468 | B1* | 7/2018 | Day | G06Q 10/103 |
| 10,073,838 | B2* | 9/2018 | Kumar | G06N 5/022 |
| 10,339,480 | B2* | 7/2019 | Berlandier | G06Q 10/06316 |
| 10,656,971 | B2* | 5/2020 | Poon | G06F 8/36 |
| 10,867,351 | B1* | 12/2020 | Vadaparty | G06Q 40/04 |
| 11,392,364 | B2* | 7/2022 | Douglas | G06F 8/656 |
| 11,620,454 | B2* | 4/2023 | Oara | G06F 8/70 |
| | | | | 717/104 |
| 2008/0052308 | A1* | 2/2008 | Zhang | G06Q 10/10 |
| | | | | 707/999.102 |
| 2010/0031232 | A1* | 2/2010 | Glazier | G06N 5/025 |
| | | | | 717/106 |
| 2014/0122377 | A1* | 5/2014 | Goodman | G06Q 10/06311 |
| | | | | 706/11 |
| 2015/0293764 | A1* | 10/2015 | Visvanathan | G06F 8/36 |
| | | | | 717/102 |
| 2016/0092811 | A1* | 3/2016 | Lyer | G06Q 10/0637 |
| | | | | 705/7.36 |
| 2018/0046965 | A1* | 2/2018 | Berlandier | G06Q 10/06316 |
| 2018/0365008 | A1* | 12/2018 | Chandramouli | G06F 8/76 |
| 2018/0365612 | A1* | 12/2018 | Spofford | G06Q 10/20 |
| 2019/0251170 | A1* | 8/2019 | Chittimalli | G06F 40/35 |
| 2020/0192646 | A1* | 6/2020 | Yerramreddy | G06Q 10/067 |
| 2020/0387497 | A1* | 12/2020 | Chittimalli | G06Q 10/10 |
| 2023/0325156 | A1* | 10/2023 | Vacchi | G06F 8/42 |
| | | | | 717/104 |

FOREIGN PATENT DOCUMENTS

| | | | | | |
|---|---|---|---|---|---|
| CN | 110196719 | A | * | 9/2019 | G06F 8/315 |
| CN | 110297620 | A | * | 10/2019 | G06F 8/24 |
| CN | 115328569 | A | * | 11/2022 | |
| CN | 110196719 | B | * | 8/2023 | G06F 8/315 |

OTHER PUBLICATIONS

Merged Text and Images from Foreign Patent Document (N).*

Kanana Ezekiel et al. "Adaptation of Business Rules in Business Workflow Systems"; School of Computing and Digital Media London Metropolitan University—Dissertation is submitted for the degree of Doctor of Philosophy, May 2021.*

Bajwa, I. S., Lee, M. G., & Bordbar, B. (2011). SBVR business rules generation from natural language specification. In AAAI Spring Symposium—Technical Report (vol. SS-11-03, pp. 2-8).

* cited by examiner

DECISION LOGIC TRANSLATION SYSTEM AND METHOD

TECHNICAL FIELD

The present disclosure generally relates to the autonomous translation of decision logic rules, and in particular to a system and method for migration of rules from one system to another.

BACKGROUND

A BRMS or business rule management system is a software system used to define, deploy, execute, monitor and maintain the variety and complexity of decision logic that is used by operational systems within an organization or enterprise. This logic, also referred to as business rules, includes policies, requirements, and conditional statements that are used to determine the tactical actions that take place in applications and systems. A BRMS includes, at minimum, a repository, allowing decision logic to be externalized from core application code, tools, allowing both technical developers and business experts to define and manage decision logic, and runtime environment, allowing applications to invoke decision logic managed within the BRMS and execute it using a business rules engine.

However, a major drawback of conventional rule management systems is the difficulty of translating existing rules in order to facilitate migration from one framework or platform to another as needed. Currently, each organization relies on decision logic that was created with no standard target format and/or the corresponding rules were written in a legacy language that is no longer in used. Furthermore, machines are unable to understand the semantic meaning of these business rules, and detection of a business rule in a code with reference to out of date or non-existent documentation. Available approaches are manual and are based on the translation of one rule at a time, which is highly inefficient and costly.

There is a need in the art for a system and method that addresses the shortcomings discussed above.

SUMMARY

The proposed systems and methods describe an automated, dynamic process for translating file formats in order to facilitate migration between BRMSs. The system and method solve the problems discussed above by providing a mechanism by which to automatically and accurately transform original code representing one or more business rules into a standardized target format that can be executable by the new BRMS. The system performs rules translation with a flexible and scalable framework that is technology agnostic. The system is configured to receive code of any type, classify the code and its text, and extract the text and determine what value the text will fill in the new code. These features (among others described) are specific improvements in way that the underlying computer system operates. In addition, the proposed system solves technical challenges with platform migration, as well as software development targeted for use in multi-cloud platform execution environments. The improvements facilitate a more efficient, accurate, consistent, and precise building of resources that will operate properly immediately upon deployment on the new platform. The improved functioning of the underlying computer hardware itself achieves further technical benefits. For example, the system avoids tedious manual conversion of legacy code, reduces manual intervention, reduces the possibility for human error, is readily 'pluggable' to any domain and rules-based application, reduces technical and support dependency on BRMS vendor tools, and increases speed to market.

In one aspect, the disclosure provides a method of translating decision or other business logic to facilitate migration between BRM (business rules management) systems. The method includes a first step of receiving, at a rules translation system, a first code in a first file format representing a first business rule. A second step includes classifying, at the rules translation system and using decision or other business logic, the first code as falling under a first rule category type, and a third step includes extracting, at the rules translation system, a first text from the first code. In addition, the method includes a fourth step of determining, at the rules translation system, the first text is associated with a variable definition, and a fifth step of assigning, at the rules translation system, a first label to the first text that designates the first text as a rule variable. Furthermore, the method includes a sixth step of filling, via the rules translation system, a first empty slot in a first code template, the first empty slot corresponding to a value for a first name, the first name representing a rule variable, and a seventh step of generating, using the filled first code template, a second code representing the first business rule, the second code being in a second file format that differs from the first file format.

In another aspect, the disclosure provides a non-transitory computer-readable medium storing software comprising instructions executable by one or more computers which, upon such execution, cause the one or more computers to: (1) receive, at a rules translation system, a first code in a first file format representing a first business rule; (2) classify, at the rules translation system and using decision or other business logic, the first code as falling under a first rule category type; (3) extract, at the rules translation system, a first text from the first code; (4) determine, at the rules translation system, the first text is associated with a variable definition; (5) assign, at the rules translation system, a first label to the first text that designates the first text as a rule variable; (6) fill, via the rules translation system, a first empty slot in a first code template, the first empty slot corresponding to a value for a first name, the first name representing a rule variable; and (7) generate, using the filled first code template, a second code representing the first business rule, the second code being in a second file format that differs from the first file format.

In yet another aspect, the disclosure provides a system for translating decision or other business logic to facilitate migration between BRM (business rules management) systems, the system comprising one or more computers and one or more storage devices storing instructions that may be operable, when executed by the one or more computers, to cause the one or more computers to: (1) receive, at a rules translation system, a first code in a first file format representing a first business rule; (2) classify, at the rules translation system and using decision logic, the first code as falling under a first rule category type; (3) extract, at the rules translation system, a first text from the first code; (4) determine, at the rules translation system, the first text is associated with a variable definition; (5) assign, at the rules translation system, a first label to the first text that designates the first text as a rule variable; (6) fill, via the rules translation system, a first empty slot in a first code template, the first empty slot corresponding to a value for a first name, the first name representing a rule variable; and (7) generate, using the filled first code template, a second code representing the first business rule, the second code being in a second file format that differs from the first file format.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A Business Rules Management System (BRMS) is a technology system used to capture decision logic as a business rule, which is then automated across applications. Business organizations utilize decision logic during normal business activities to better define and/or control how the business operates and/or to ensure consistent application of one or more business policies. In many cases, decision logic may be used to identify core concepts and/or to provide structure to business operations. Decision logic may apply to people, processes, corporate behavior and/or computer implemented policies so that business activities may comply with a core set of business goals. Business rules are the individual statements of decision logic that determine the result of a business decision. It can be appreciated that changes in business rules will occur regularly, for example to accommodate new legislative requirements, dynamic markets, maintenance, the need to retire legacy applications, etc. However, the process of moving a set of decision logic/rules of an application from one platform to another, also referred to as migration, has remained onerous and costly, particularly as each rule must manually translated to the target format, where even a single error can potentially lead to significant damage to the operation of the application.

Typically, business rules are often originally written in a natural language (NL), or in native or non-native code. Translating the rules into a particular rule language, such as JavaScript Object Notation (JSON), Extensible Markup Language (XML), JavaScript, Excel, etc., can be very complex. This translation requires identification of the structure, as well as conversion from the structure to the standardized format. Recognizing the structure of nonstandard language that can be presented in numerous unstructured ways is difficult, and it is especially difficult to approach this task with a standardized process that can be applied to a variety of unknown structures. It is also burdensome to create a system that can convert rules from a nonstandard structure to a large variety of standard formats. In other words, the system must be capable of recognizing numerous nonstandard formats and converting the same to numerous standard formats. In order to address these deficiencies, the proposed systems and method describe a standardized approach to breaking down the format of the unstructured rule to convert the rule to numerous standard formats. A cognitive engine, as described herein, can determine the structure or formulation of each rule by identifying elements in the structure, such as the variables, atomic link, instance formulation, logical operators, and quantifiers. The translation, relying on the output of the cognitive engine, allows the rules to be readily digested by new platforms with little to no loss of functionality.

Figure 1:
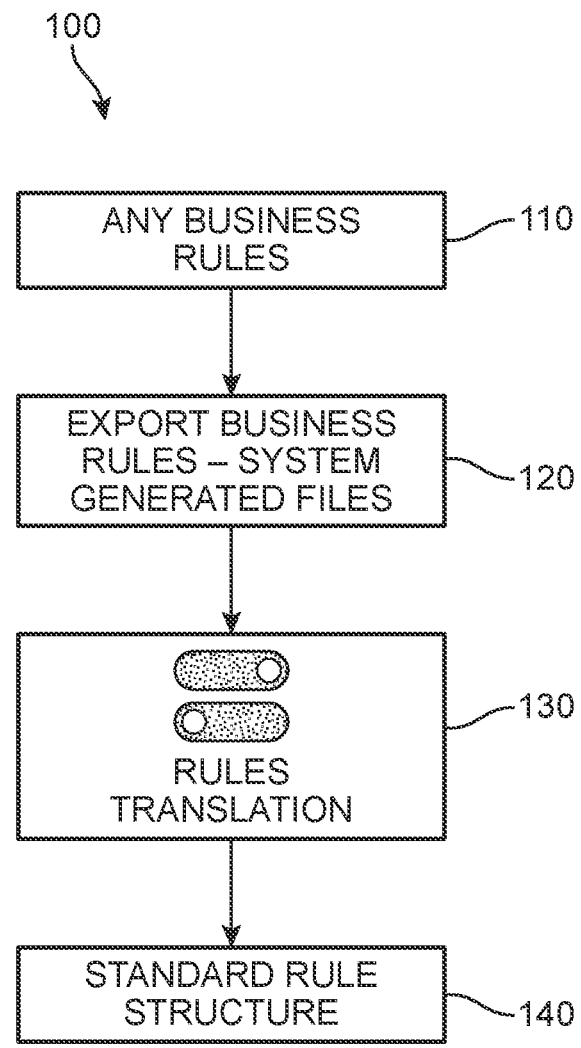
FIG. 1 is an overview of an embodiment of a process for an automated translation of business rules.

For purposes of introduction, an overview of an embodiment of a process 100 for employing a decision logic translation system is presented in FIG. 1. The selected business rules 110 are processed in preparation of exportation 120. The business system generated files are received by the decision logic translation system ("translation system")

130, which outputs the same content in a standard rule structure 140, according to the selected target format. The process involves system tailored logic-based rule extraction. In general, methods or processes for extracting business rules have been difficult to reproduce and do not present clearly the extracted rules regarding the concepts of business rules, their composition and categorization. These drawbacks lead to incomplete extraction of rules and massive manual effort to achieve a complete extraction and verification. In contrast, the proposed system overcomes these drawbacks, and outputs files that can then be easily used to migrate the business rules to a new platform.

In different embodiments, decision logic may be used to define relationships between a business activity and a possible outcome resulting from that activity. As such, decision logic may be used to define a transformation of inputs into a process and outputs resulting from the process. The decision logic developed by an organization can become essential, and the daily operations of the organization enmeshed in the original BRMS selected for implementation of its rules. In some cases, the difficulty of rules translation can discourage businesses from shifting from one framework to another that would otherwise offer far more advantages. It can be appreciated that an automated rules translation service can significantly improve and streamline the migration process and allow clients to more readily adapt to new platforms.

For example, in some cases, a business may rely on legacy information systems that have had a long evolution, longer than the typical turnaround time of the developers in the company. In consequence, they are often built with outdated technologies and paradigms from the point of view of the current developers. However, they are essential to the business and they encode large amounts of essential information related to the business processes. Continuous changes in the domain of some systems, the lack of strict maintenance processes, and the turnaround of developers inevitably leads to gradual loss of knowledge about the system and its domain, most often corroborated by the fact that external documentation is rarely updated in sync with the code and other artifacts (e.g., databases). Yet shifting this information has remained burdensome.

In addition, while some decision logic may remain static once defined, others may be changeable as processes evolve over time. Because of this changeable nature, businesses that are not dependent on code being limited to its original format may be more likely to respond dynamically to and manage these changes to ensure the business organization remains agile, to improve employee productivity and to reduce information technology costs, both in personnel time and in supporting technologies (e.g., software, hardware, and the like). A translation system as described herein may allow a business organization to control costs associated with deployment of rules, either new rules or modified versions of existing rules, to author and/or maintain rules using non-technical language, to increase decision automation, to allow for decision logic to be shared between different business functions and/or business units, and other such reasons. In doing so, the translation system may reduce costs incurred by the business organization as a result of rules changes, improve efficiency of business processes and/or to enable sharing and/or reuse of the decision logic.

For example, insurance providers may implement decision logic to define parameters when processing claims, underwriting and/or providing quotations for insurance policies, and/or providing annuities. A financial institution may use decision logic for evaluating loans offers (e.g., a risk, individual eligibility, pricing, and the like), account evaluations (e.g., determining related sales opportunities, identifying improper account access, issuing an alert, and the like), credit card evaluations (e.g., defining marketing opportunities, identifying improper credit card use, defining a credit limit, and the like), and/or other business functions (e.g., offering loans, brokerage activities, and the like). Healthcare organizations may define rules to evaluate patient interaction with the healthcare organization, provider interaction with patients, and/or other activities. Other business activities may include offer configuration, order management, network monitoring, online services, billing activities, contract management, claims processing, entitlement and/or benefit calculation, commissioning activities, promotions management, and/or the like. Each of these types of business activities are by nature dynamic and, depending on the technical processes and components available at any given time, or the needs and priorities of the organization, certain platforms may be more desirable at sometimes and another platform more desirable at another time. The ability to migrate—regardless of the original code structure in which the rule was developed—by converting the original structure to any other target format offers significant advantages.

Many BRMS products may be available to a business organization in the marketplace. Once selected, the business organization may incur costs when purchasing and/or installing hardware and/or software infrastructure to support the BRMS. While a BRMS may be used to ensure that decision logic are not hard-coded into processes so that rules are hidden or isolated within specific organizations, the BRMS, however, may be tied to the decision logic and/or business processes in such a manner that changes may be difficult to implement, cost prohibitive, or both. For example, a hardware and/or operating system requirements may differ between the different vendor products or, in some cases, between versions of a particular BRMS product. In some cases, different BRMS products may support a different combination of programming languages, so that a desired programming language may not be supported by every BRMS. Further, some vendor BRMS products may be integrated into a suite of related products, further increasing costs that may be incurred over time. Many BRMS products may also be implemented in a vendor specific manner. For example, different BRMS products may format the decision logic and/or business rule designs differently so that rules implemented using a first BRMS product may not be easily translatable into a different second BRMS product. Additionally, rules repositories may be formatted to use a vendor-specific format, so that existing rules repositories may not easily be transferred between BRMS products. Further, a BRMS may require a specified hardware infrastructure to be installed. These differences may adversely impact business organizations with geographically or functionally distinct business units. In some cases, different BRMS products may be selected by different business units, so that decision logic and/or policies may not be easily shared or implemented at other platforms.

As such, it can be appreciated that there is a need for a vendor agnostic decision logic translation framework to allow a business organization to translate rules from a first system to a second system, while minimizing costs and errors associated with a migration. In some embodiments, the decision logic framework described herein may allow for easier sharing of decision logic between business units, including improved version management capabilities, even when different BRMS are used by different business units.

Users may include rule designers, software developers, business analysts, process owners, business leaders, and/or other users associated with the business organization. Further, the business system interface may facilitate deployment of decision logic to one or more rule execution servers when applying the rules to different business policies.

In some embodiments, the decision logic framework may also include a BRMS interface for facilitating communication between the decision logic framework and one or more BRMSs. For example, the decision logic interface may allow for rule designers and/or other business users to enter and/or modify rules stored in one or more different BRMSs, while using an interface common across a plurality of business units of the business regardless of the platform being used when implementing the decision logic and/or business policies utilizing the rules. The decision logic framework also may allow an information technology (IT) group of the business organization update and/or modify systems associated with the decision logic management system with minimal impact to users and/or business activities. Further, the decision logic framework may allow for updates and/or other modifications to be performed on an installed BRMS, including changing BRMS products, without requiring users to redesign decision logic and/or business policies associated with the decision logic. For example, the decision logic framework can allow business decision makers to evaluate an operation of different decision logic management systems to allow the decision makers to select a BRMS that best suits the needs of the organization (e.g., ease of use, flexibility, cost, business infrastructure requirements, and the like). In other words, because the proposed systems can convert a business rule from any format to a standard format, when a BRMS is to be updated or replaced, the business can elect to switch vendors supporting the underlying BRMS without impacting the business units' operation. As will be discussed in greater detail below, the proposed systems are configured to automate and streamline the transfer of business rules from one platform to another by automatic translation of each rule with high accuracy.

Figure 2:
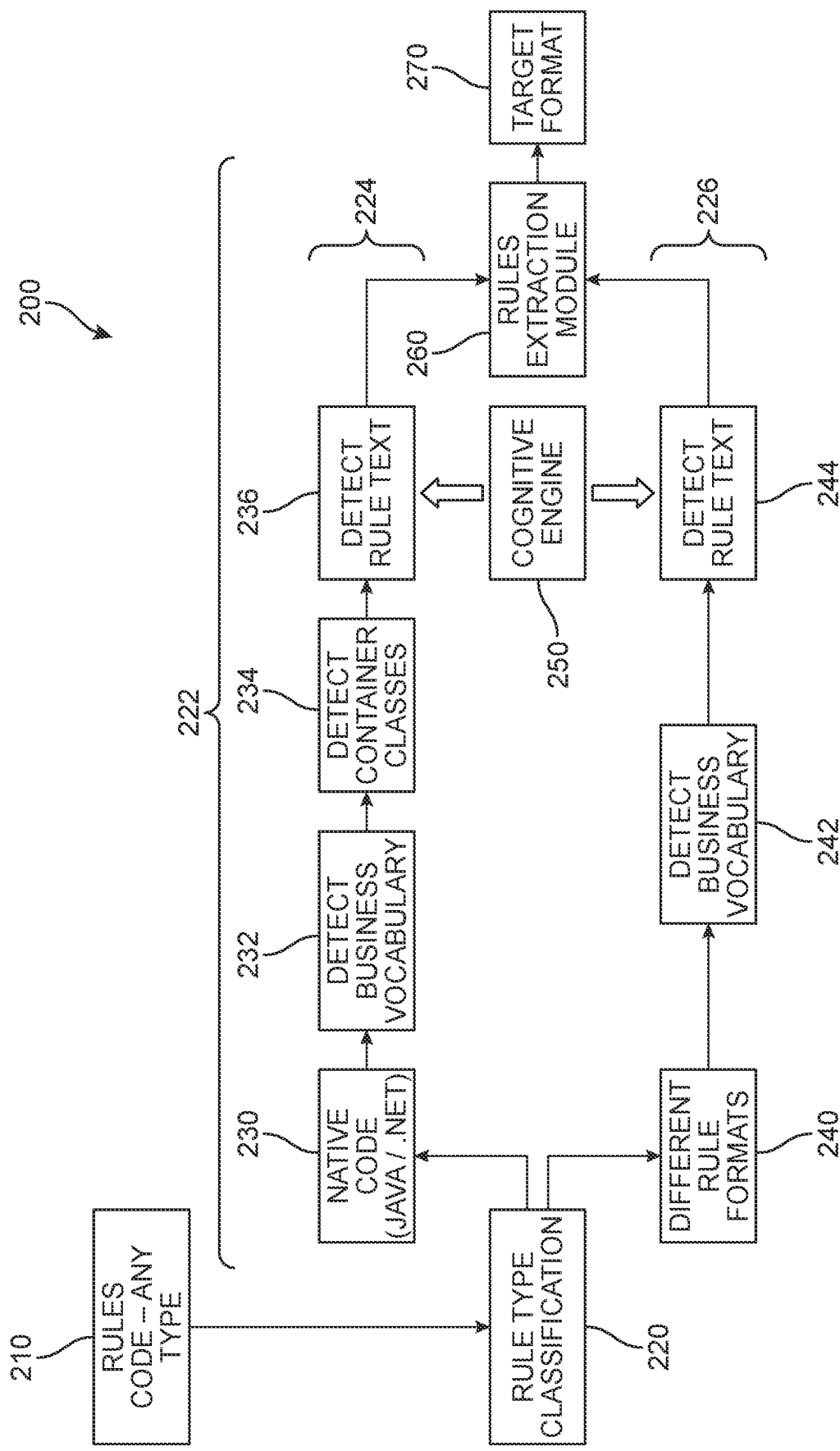
FIG. 2 is a high-level view of a rule translation system, according to an embodiment.

Moving now to FIG. 2, as an overview, an embodiment of a technical architecture and process for a translation system 200 (or system 200) is depicted. As noted above, code 210 for a business rule of any format can be submitted to the system 200. The code 210 can then undergo classification 220 by the system 200. In one embodiment, classification 222 involves different paths depending on the original code type. As shown in FIG. 2, there is at least a first path 224 for native format(s) 230 involving JAVA or .Net code and a second path 226 for rules of other formats 240, each path including several steps and dependent on the use of a cognitive engine 250. In the first path 224, the system 200 can detect specific vocabulary 232 in the submitted native format(s) 230.

As a general matter, to be able to formalize the rules and to use their semantics, it is necessary to create and establish business vocabulary. Typically, businesses will have a business vocabulary repository that defines all the concepts that will be received by the system 200 for compilation of business rules. These concepts can add the necessary conjunctions, prepositions, numbers, time and financial units, etc. This pre-established business vocabulary can be understood to include the terms that are used to construction of business rules. The business vocabulary that can be detected by the system 200 is with reference to the business's vocabulary repository.

Once the vocabulary is detected, the system 200 can proceed to determine semantic rules, where the system 200 can parse the statement into elemental parts and decipher the meaning of the statement. While syntax examines the allowable structure and determines what is in the language enabled and disabled, semantics examines already tested correction elements of the program and tries to assign them logical meaning to recognize and decode their importance in a computer program. The cognitive engine 250 is configured to determine the structure or formulation of a business rule. The logical formulation describes several basic elements: (a) Variable—one particular element of business vocabulary; (b) Unitary variable—specific element: goods; (c) Atomic link—links several variables into one unit; (d) Instance formulation—gives variable its meaning; (e) Logical operations-unary/binary, AND, OR, NOT, etc.; and (f) Quantifiers—universal, existential, exactly n items, most n, at least n, etc.

For each term or phrase of vocabulary 232 parsed, the system 200 can detect or determine which container class 234 should be assigned. With reference to cognitive engine 250 and based on these container classes 234, the system 200 can then detect or identify rule text 236. The cognitive engine 250 can perform a robust semantic analysis of the language using (a) a domain corpus and database column names, (b) pseudo code of rule pattern(s), and (c) domain taxonomy. In some embodiments, a Levenshtein distance algorithm is used. The cognitive engine 250 can also parse any English text. This rule text 236 is then submitted to a rules extraction module 260, which can generate and output a reformatted version of the original rule in a target format 270 (e.g., JSON, XML, JavaScript, Excel, etc.). As a general matter, Business Rules Extraction (BRE) can be understood to refer to a reverse engineering process for recovering Business Rules (BR) from software information.

Figure 3:
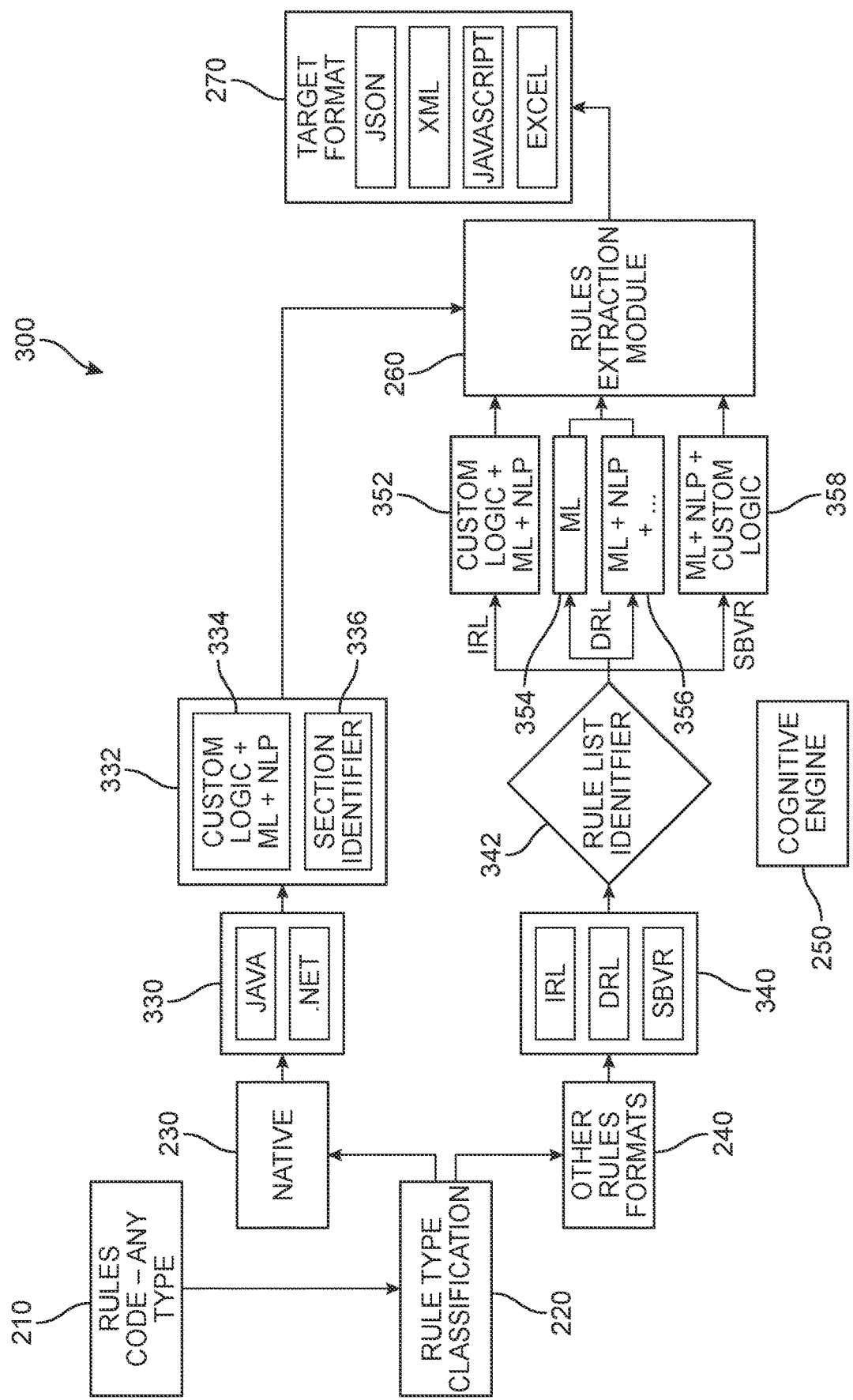
FIG. 3 is a schematic flow diagram of an embodiment of the rule translation system, according to an embodiment.

In the second path 226, the system 200 can detect specific vocabulary 232 in the submitted code employing other (non-native) formats 240. However, the system 200 can also perform an additional step, as shown in FIG. 3. Once the rule list is identified, for each term or phrase of vocabulary 242 in the rule, the system 200 can then detect or identify rule text 244 via cognitive engine 250. This rule text 244 is then submitted to the rules extraction module 260, which can generate and output a reformatted version of the original rule in the target format 270 (e.g., JSON, XML, JavaScript, Excel, etc.). While JSON, XML, JavaScript, and Excel are given as examples, the method may include reformatting the original rules to other target formats not listed. The disclosed system and method can accommodate new target formats as they emerge by simply creating a template for the new target format.

As will be discussed in greater detail in FIGS. 5-7, in different embodiments, the rules extraction module 260 can extract terms for classification under various categories, such as but not limited to variable definitions, rule structure, condition structure, expression, and rule data. In addition, there may be a plurality of categorization labels associated with these categories. For example, a ruleset can comprise: (a) Rule Name; (b) Rule global constant; (c) Rule global constant variables; (d) Rule Variable; (e) Rule Object; (f) Rule Text; (g) Rule Loop; (h) Rule Number; (i) Rule Salience; (j) Rule Expression; (k) Rule Condition; and (l) Rule Consequence/Action.

Generally, the ruleset specifies that when a particular set of conditions occur, specified in the Left Hand Side (LHS), then do what query is specified as a list of actions in the Right Hand Side (RHS). A rule must have a name, unique within its rule package. The LHS of the rule follows the when keyword (ideally on a new line), similarly the RHS follows the then keyword (again, ideally on a newline). The rule is terminated by the keyword end. Rules cannot be nested. The above listed variables and attributes are typically written one per line. Rule attributes provide a declarative way to influence the behavior of the rule. Some are quite simple, while others are part of complex subsystems such as ruleflow. For example, Rule Salience refers to an integer salience attribute which defaults to zero and can be negative or positive. Salience is a form of priority where rules with higher salience values are given higher priority when ordered in the Activation queue. Its default value is zero, and type is integer. Each attribute listed can have its own function. Similarly, global variables are used to make application objects available to the rules. Typically, they are used to provide data or services that the rules use, especially application services used in rule consequences, and to return data from the rules, like logs or values added in rule consequences, or for the rules to interact with the application, doing callbacks.

Figure 4:
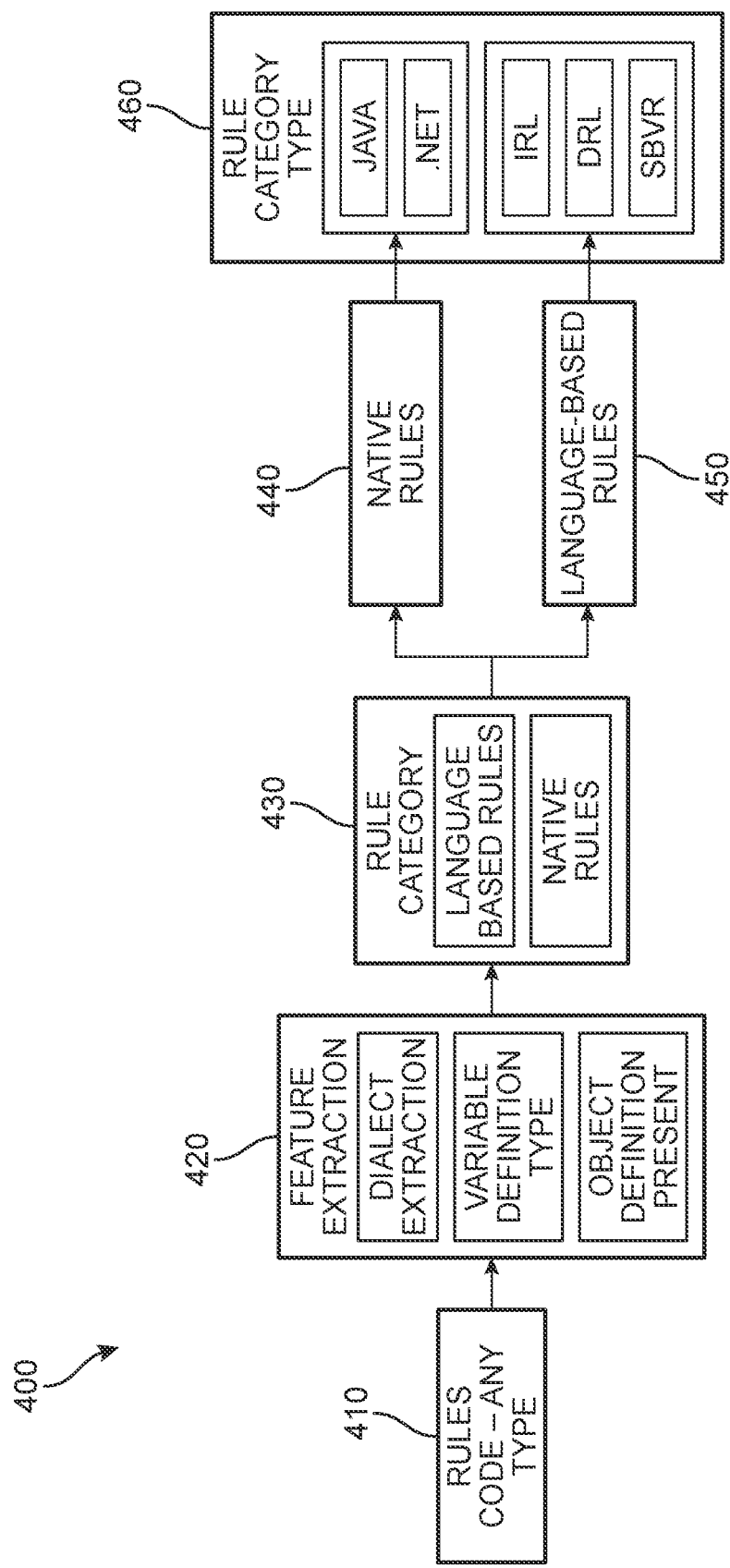
FIG. 4 is a schematic flow diagram depicting a classification process for the rules translation system, according to an embodiment.

Additional details regarding the translation system are provided in a schematic flow diagram 300 of FIG. 3 and classification flow diagram 400 of FIG. 4. In FIG. 3, as described above, code 210 of any format is inputted into the system, and classification 220 is performed. In the case of a code in native format(s) 230, such as native languages 330 (JAVA, .Net), a first process 332 including the application of individualized (i.e., system-tailored) decision logic, machine learning, and natural language processing techniques 334 occurs, as well as section identification 336. The output of the first process 332 is then submitted to the rules extraction module 260 for final translation to the target format 270. The cognitive engine 250 supports and enables this process. It can be appreciated that, in some embodiments, the generation of rules from codes employing native format(s) 230 may occur without further steps.

In cases where the code is in other format(s) 340, such as but not limited to IRL, DRL, and SBVR, a rule list identifier module 342 is invoked. The rule list identifier module 342 determines in which format the code is written and, based on the determination, applies a specific process. For example, in cases of IRL (I LOG Rule Language) code, a second process 352 involving IRL-associated decision logic, machine learning, and natural language processing techniques are applied. In the case of DRL (drools rule language formalism), either of a third process 354 including a DRL-configured machine learning model and a fourth process 356 including DRL-associated machine learning model and natural language processing techniques may be applied. In the case of SBVR (Semantic Business Vocabulary and business Rules), a fifth process 358 including SBVR-associated decision logic, machine learning, and natural language processing techniques are applied. The cognitive engine 250 supports and enables this process. The output is then submitted to the rules extraction module 260 for final translation to the target format 270.

The classification flow diagram 400 of FIG. 4 depicts further details regarding an embodiment the classification process (i.e., where the system determines which language the rule is using) that must occur before translation. In a first stage 410, rules are submitted to the system. In a second stage 420, feature extraction is performed, including dialect extraction, determining variable definition type, and whether object definition is present. This information allows the system to determine what legacy format the code is in (e.g., native or other). In a third stage 430, rule categorization occurs, using language-based rules or native rules. Based on the categorization, a fourth stage 440 refers to classification of native rules in determination of a rule category type 460 for the submitted code (JAVA or .Net), or alternately, a fifth stage 450 refers to classification of language-based rules in determination of the rule category type 460 (IRL, DRL, SBVR).

For purposes of clarity, an example will be described. In a first example, a rule employing an SBVR-based code (e.g., "A Person's Age should be more than or equal to 28 years/Accept loan application form") where "/" corresponds to a line break can be submitted to the system (first stage 410). In such cases, the dialect extraction process can apply individualized (i.e., system-tailored) decision logic and program parsing during feature extraction (second stage 420) to obtain "should be more than or equal to", and variable definition type ("Text") is determined using regex, a CNN model, and NLTK (python natural language toolkit). The object definition ("No") is determined using a CNN model. In the third stage 430, rule categorization can use a T5 model or a Bidirectional Encoder Representations from Transformers (BERT) classifier model, which can assign the rule category type 460.

Figure 5:
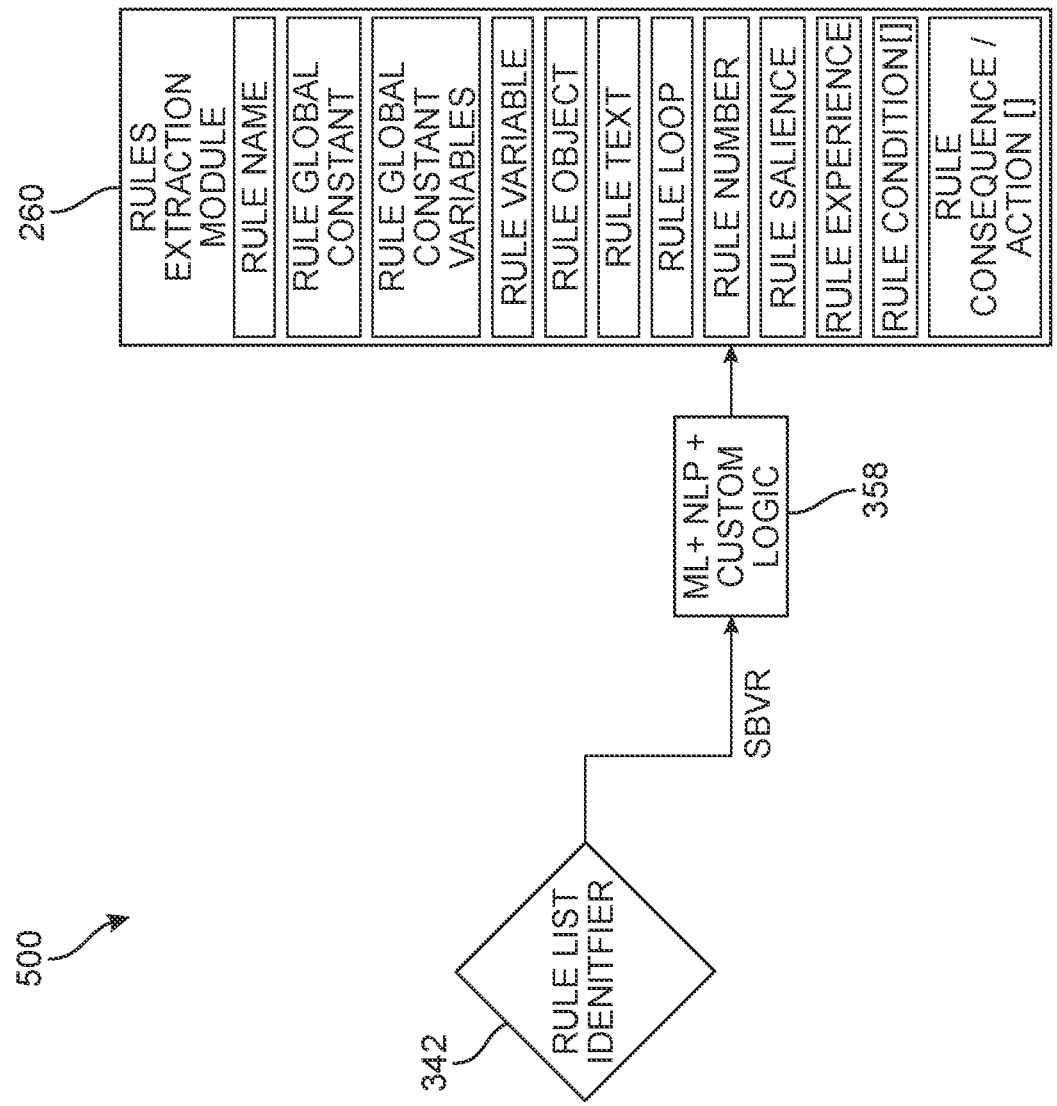
FIG. 5 is a schematic diagram of an embodiment of a process of translating an SBVR file format-based rule, according to an embodiment.

A first rule extraction process 500 based on the example above is depicted in further detail in an SBVR flow diagram of FIG. 5. In FIG. 5, it can be seen that once the rule category (SBVR) has been determined by the rule list identifier module 342 as described in FIG. 4, the fifth process 358 involving machine learning, natural language processing techniques, and individualized (i.e., system-tailored) decision logic are employed in order to prepare inputs and system resources for the rules extraction module 260. In one example, an SBVR can have an object, which can be a variable, and conditions. It can be appreciated that in different embodiments, not all of the labels will be required or used. The below table presents an example of the rules extraction process with respect to the submitted code: "A Person's Age should be more than or equal to 28 years/ Accept loan application form".

| Rules Extraction ruleset | | Extraction Technique | Output |
|---|---|---|---|
| NER-Spacy | Rule Name | Natural Language Processing (NLP)-Named Entity Recognition (NER) rules library and other libraries as appropriate | Loan eligibility |
| | Rule global constant | | |
| | Rule global constant variables | | |
| distilBERT | Rule Variable | Domain Corpus and DB column names, and ontology | Age, loan application form status |
| | Rule Object | | |
| | Rule Text | Parse English text | A person's |
| | Rule Loop | | |
| | Rule Number | Decision logic for sequence number | 1 |
| | Rule Salience | Autogenerated number (customizable) | 1 |
| | Rule Expression | | |
| RegEx, T5, Custom pattern matching | Rule Condition[ ] | Pseudo code of rule pattern | More than or equal to |

| Rules Extraction ruleset | | Extraction Technique | Output |
|---|---|---|---|
| Levenshtein Distance | Rule Consequence/ Action | String-matching algorithms, Levenshtein distance algorithm | Loan application = accept |

It can be seen that, depending on the rule category, only some of the rule labels need be filled.

Using this extracted data, an empty JavaScript Object Notation (JSON) file with slots for receiving values can now be automatically filled by the system, thereby re-formatting the code in a standardized presentation that is migration-ready, for example as shown below:

{
"Rule": "eligibility",
"Details": {
"conceptRoleNoun": "person",
"conceptFactAttribute": "age",
"operator": ["at least","exactly"],
"limitYears": "28",
"sentenceStructureSubject": "It",
"sentenceStructureVerb": "is",
"sentenceStructureAdVerb": "obligatory",
"sentenceStructureconnect": "that",
"sentenceStructureModelVerb": "should be")
}

Figure 6:
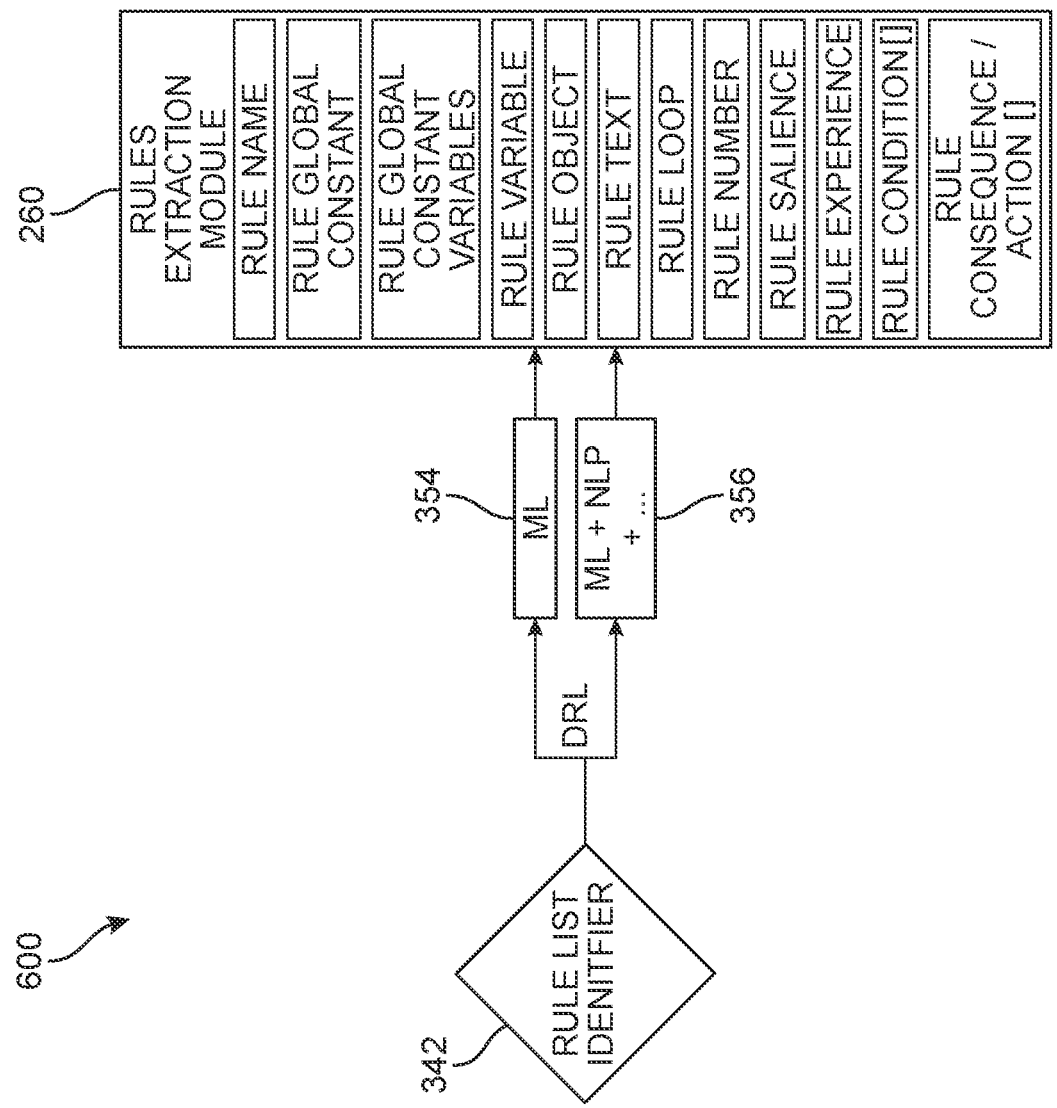
FIG. 6 is a schematic diagram of an embodiment of a process of translating a DRL file format-based rule, according to an embodiment.

A second rule extraction process 600 based on a second example is now presented with reference to a DRL flow diagram of FIG. 6. In FIG. 6 it can be seen that once a rule category (DRL) has been determined by the rule list identifier 342 module (see FIG. 4), the third process 354 and/or fourth process 356 involving machine learning, natural language processing techniques, and individualized (i.e., system-tailored) decision logic can be employed in order to prepare inputs and system resources for the rules extraction module 260. It can be appreciated that in different embodiments, not all of the labels will be required or used. The below table presents an example of the rules extraction process with respect to the submitted code: rule "LoanApproved"/when/Customer(credit>700) && not exist LoanOutstanding( )/then/insert (new LoanApproval( ))/end.

| Rules Extraction ruleset | | Extraction Technique | Output |
|---|---|---|---|
| NER-Spacy | Rule Name | NLP-NER rules library and other libraries as appropriate | Loan approved |
| | Rule global constant | | |
| | Rule global constant variables | | |
| distilBERT | Rule Variable | Domain Corpus and DB column names, and ontology | Credit, loanOutstanding |
| | Rule Object | | |
| CRF NLP, Spacy | Rule Text | Parse English text | Customer |
| | Rule Loop | Natural language based conditional clause | When, then |
| | Rule Number | Custom decision logic for sequence number | 1 |
| | Rule Salience | Autogenerated number (customizable) | 1 |

| Rules Extraction ruleset | | Extraction Technique | Output |
|---|---|---|---|
| RegEx, T5, | Rule Expression Rule Condition[ ] | RegEx, Pseudo code of rule pattern, Custom NLP | Credit > 700, loanOutstanding = 0 |
| Levenshtein Distance | Rule Consequence/ Action | String-matching algorithms, Custom NLP | New loan approval |

It can again be seen that, in different embodiments, and depending on the rule category, only some of the rule labels need be filled. In addition, the technique used can also be modified in response to the type of rule category the rule was determined to fall under.

Using this extracted data, an empty JSON file can be automatically filled by the system, thereby re-formatting the code in a standardized presentation, for example for use by a DROOLS, as shown below:

{
"Rule": "LoanApproved",
"Details": {
"condition":
"customer": "customer",
"productLoan": "credit",
"outstanding": "not exist Loanoutstanding",
"operator":
},
"message": "new LoanApproval"
}

In some cases, a rule classified under the same category can have different or additional labels filled based on the rule's contents. For purposes of comparison, the below table presents an example of the rules extraction process with respect to the submitted DRL code: Rule "Schedule For Testing"/when/$candidate: Candidate(status=='Submitted', yrsExperience>=10,/skill(name=='Java', yrsExperience>=S) or Skill(name=='C #', yrsExper/then/ $candidate.setStatus('Testing');/end.

| Rules Extraction ruleset | | Extraction Technique | Output |
|---|---|---|---|
| NER-Spacy | Rule Name | NLP-name entity extraction rules library | Schedule_for_ testing |
| | Rule global constant | | |
| | Rule global constant variables | | |
| distilbert | Rule Variable | Domain Corpus and DB column names, and ontology | Candidate.status, skill.yrsExperience |
| distilbert, LDA | Rule Object | Parts of speech tagger and extractor | Candidate, skill |
| CRF NLP, Spacy | Rule Text | Parse English text | Customer |
| | Rule Loop | Natural language based conditional clause | When, then |
| | Rule Number | Custom decision logic for sequence number | 1 |
| | Rule Salience | Autogenerated number (customizable) | 1 |
| RegEx, T5, | Rule Expression Rule Condition[ ] | RegEx, Pseudo code of rule pattern, Custom NLP | Submitted, >10, JAVA >= 10, OR C# >= 5 |

-continued

| Rules Extraction ruleset | Extraction Technique | Output |
|---|---|---|
| Levenshtein Distance | Rule Consequence/ Action | String-matching algorithms, Custom NLP | Candidate.status = Testing |

Using this extracted data, an empty JSON file can be filled, thereby re-formatting the code in a standardized presentation, for example for use by a DROOLS, as shown below:

{
"Rule": "Schedule For Testing",
"Details":
"common info"
"candidate": "submitted",
"Total experience . . . : "10",
"operator": ">=",
},
"logic": "OR",
"Condition": [{
"experience": "10",
"operator": ">=",
"skill": "java"
},
{
"experience": "5",
"operator": ">-",
"skill": "C #"
}
],
"candidateStatus": "Testing"
}
}

Figure 7:
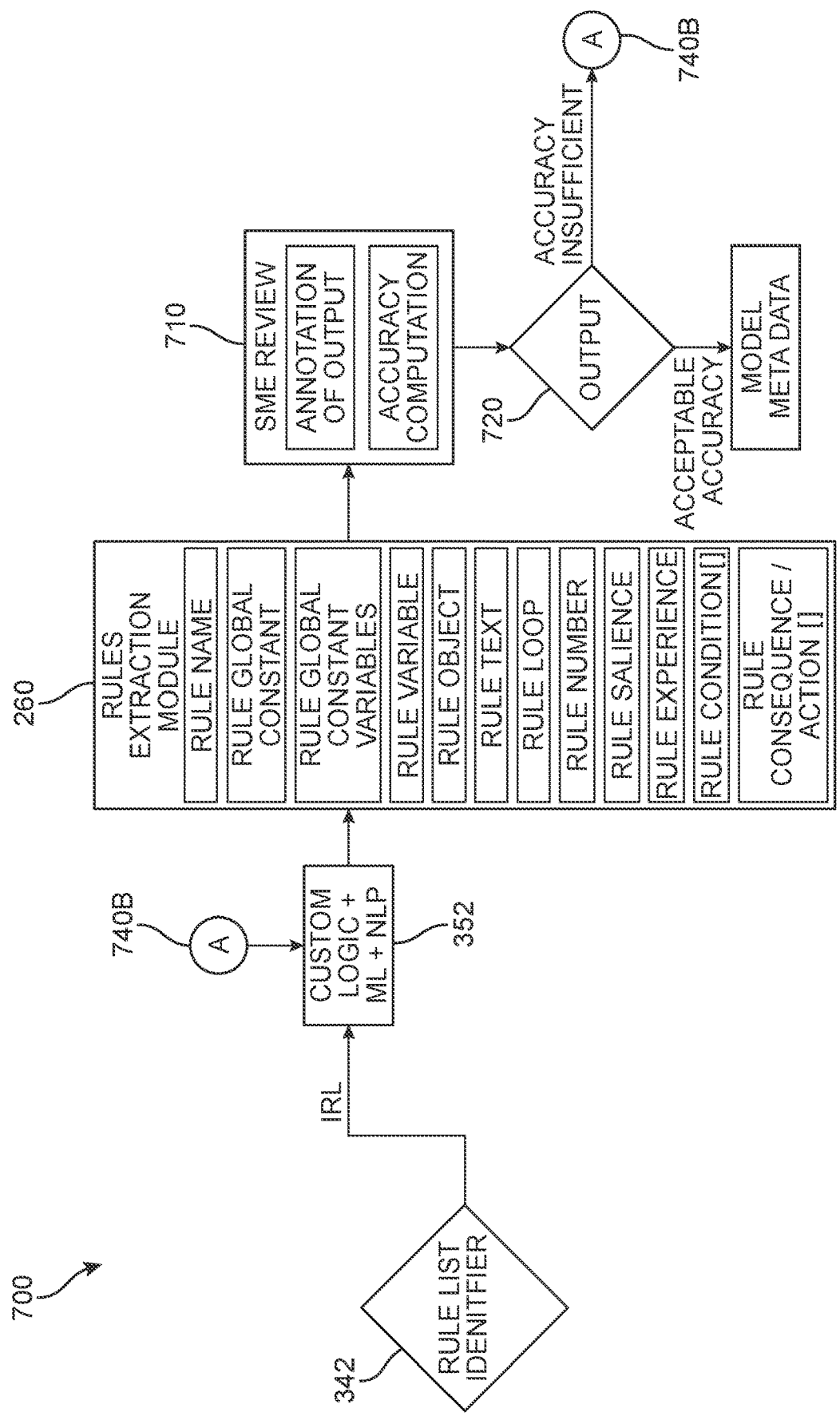
FIG. 7 is a schematic diagram of an embodiment of a process of translating an IRL file format-based rule, according to an embodiment.

A third rule extraction process 700 based on a third example is now presented with reference to an IRL flow diagram of FIG. 7. In FIG. 7 it can be seen that once a rule category (IRL, in this case IBM ODM) has been determined by the rule list identifier 342 module (see FIG. 4), the second process 352 involving machine learning, natural language processing techniques, and individualized (i.e., system-tailored) decision logic can be employed in order to prepare inputs and system resources for the rules extraction module 260. It can be appreciated that in different embodiments, not all of the labels will be required or used. An example of the rules extraction process with respect to the submitted code:

36 rule CA_T4_37_08_17_0
37 property coverage="IBLNADIN"
38 property govState=" ";
39 property.ilog.rules. business_name="CA T4 37 08 17 111;
40 property.ilog.rules. dt="Determine AUTO Fill In Forms.CA T4 37 08 17";
41 property.ilog.rules.group="Determine_AUTO Fill_In_Forms.CA_T4_37 08_17";
42 property.ilog. rules. package_name="Determine AUTO Fill In Forms";
43 property issuingBusUnit=1111;
44 property locState=1111;
45 property productGroup="AUTO";
46 property ruleCategory="Auto (AU)";
47 property ruleDescription="Blanket Additional Insured";
48 property ruleNumber="CAT4370817";
49 property ruleOverridePermittedind=false;
50 property ruleSubCategory="GENERAL";
51 property ruleType="Forms";
52 property status="deployable";
53 property transactionProcess="RATE";
54 property version Id="1.0";
55 when {
56 com.ace.bi.scbp.xom.covpart.AutoCoveragePart ( ) from autoCovPartin;
57 var_10: collect com. ace, bi, scbp. xom. covpart.AutoCovPartState (?this. hascoverage (interDiffinCondandExcessLiabCovCode).booleanValue ( )
58 in autoCovPartln.autoCovPartStates;
59 com. ace.bi. scbp. xom. policy. Policyo from policy In;
60
61 evaluate (((var$_$_0.size( )>0) &&
62 (((com.ace.bi. scbp. xom. common. Helper.convertDateFromString (pol icyin. transaction. rateEntryDt). compareTo (new java.util.Date(ilog.rules.brl.IlrDateUti I.getLocalTime)2018, 6, 15, 0, 0, 0, 0))1>=0 &&
63 ((com.ace.bi. scbp. xom. common.Helper. convertDateFromString (policy In. effectiveDt).compareTo (new java. util. Date (ilog. rules.brIl. IlrDateUtil.getLocalTime (2018, 6, 15, 0, 0, 0, 0)))>=0 &&
64 (autoCovPartln.governingStateCd in (FLORIDA,HAWAII))))));
65} then {
66 aNewAUOFormsListItem=policyin. transaction. createNewFormsListi tem("CA T4 40", "08 1 7", "Blanket Additional Insured", corn. ace.bi. scbp. xom. common.Action.add,
java.lang. Boolean. valueOf(true), java.lang.Boolean.valueOf(false), java.lang.Boolean. valueOf(true), java. lang. Boolean. valueOf(true), textonlyFormTypeCd,
is shown in the table below:

| Rules Extraction ruleset | Extraction Technique | Output |
|---|---|---|
| NER-Spacy | Rule Name | NLP-name entity extraction rules library | CAT43708170 |
| NER-Spacy | Rule global constant | Domain Corpus and DB column names, and ontology | property_coverage, property_govState, property.ilog.rules. business_name, . . . |
| NER-Spacy | Rule global constant variables | Domain Corpus and DB column names, and ontology | IBLNADN, CA_T4_37_08_17_1, . . . |
| distilbert | Rule Variable | Domain Corpus and DB column names, and ontology | Candidate.status, skill.yrsExperience |
| distilbert, LDA | Rule Object | Parts of speech tagger and extractor | Candidate, skill |
| CRF | Rule Text | Parse English text | Customer |
| NLP, Spacy | Rule Loop | Natural language based conditional clause | When, then |
| | Rule Number | Decision logic for sequence number | 1 |
| | Rule Salience | Autogenerated number (customizable) | 1 |

-continued

| Rules Extraction ruleset | Extraction Technique | Output |
|---|---|---|
| RegEx, T5, | Rule Expression Rule Condition[ ] | RegEx, Pseudo code of rule pattern, NLP | Submitted, >10, JAVA >= 10, OR C# >= 5 |
| Levenshtein Distance | Rule Consequence/ Action | String-matching algorithms, NLP | Candidate.status = Testing |

In different embodiments, the system performs the conversion to the new format by implementing several components, including (a) rule criteria—extraction of key values from IRL properties; (b) dates—extraction of the key, value, and operator from the evaluated section; (c) definitions—extraction of values from variable section evaluated; (d) conditions—extraction of values from the evaluated section and removal of the unnecessary content which is kept in the config file; (e) decision table—extraction of the values from the evaluated section after dating and removing the unnecessary content, and (f) output—extraction of values from the 'then' section. Thus, empty values can be understood to serve as slots or bins for receiving data. Using the extracted data, an empty JSON file can be filled, thereby re-formatting the code in a standardized presentation, as shown below:

"type": " ",
"ruleCriteria": [{
  "coverage": "IBLNADIN",
  "govState": " ",
  "ilog.rules.business name": "CA T4 37 08 17 1",
  "ilog.rules.dt": "Determine AUTO Fill In Forms.CA T4 37 08
  "ilog.rules.group": "Determine AUTO Fill In Forms.CA T4 37
  "ilog.rules.package name": "Determine AUTO Fill In Forms",
  "issuing BusUnit"
  "locState": " ",
  "productGroup": "AUTO",
  "ruleCategory": "Auto (AU)"
  "ruleDescription": "Blanket Additional Insured",
  "ruleNumber": '1CAT437081 71",
  "ruleOverridePermittedind": "false",
  "ruleSubCategory": "GENERAL",
  "ruleType": "Forms",
  "status": "deployable",
  "transactionProcess": "RATE",
  "versionid": "1. 0"
"dates": [{
  "key": "policyin.transaction.rateEntryDt",
  "value": "2018-7-15",
  "operator"
  },
  {
  "key": "policyin. effecti veDt",
  "value": "2018-7-1",
  "operator": ">=" }],
"definitions": [{
  "variable": "var$ $0",
  "level": "covpart.AutoCovPartState",
  "xsitye": " "
  "Objecttype": "collect",
  "operator": "in",
  "path": "autoCovPartin.autocovPartStates",
  "criteria": "(?this.hascoverage('INTDIF')"
}],
"conditions": "[(var$ $0.size>0)]",
"DecisionTable": [{
  "leve;": "autoCovPartin. overnin StateCd"
  "values": "autoeovPartin.governingStateCd in {'FLORIDA', 'HAWAII'}" ],
  "output": {
    "formNbr":
    "formEdDt": "08 17"
    ||
    "formTitle": "Blanket Additional Insured"
    "actioned": "add",
    "displayind": "true",
    "manuscriptlnd": "false",
    "printlnd": "true",
    "pullListind": "true",
    "formType": "textonlyFormTypeed",
    "applicableSta teed": "a null string",
    "handlingTypeCd": "a null string",
    "occurrenceid": "a null string",
    "displayFormNbr": "CA T4 37",
    "formShortNrn": "Blanket Additional Insured",
    "localPrintEligibleind": "false" }}

In some cases where a limit or other policy is in place due to client requirements, word replacements can also be performed. For example, the line:
  "values": "autoeovPartin.governingStateCd in {'FLORIDA', 'HAWAII'}"
may be rewritten to recite:
  "values": "autoeovPartin.governingStateCd in {'FL', 'HI' }"
to meet a string replacement value.

In some embodiments, extraction training can also be performed using the output as training data—for example, the output shown in the example table above can be further submitted to a subject matter expert (SME) for review, as shown in a post-output stage 710 in FIG. 7. In some embodiments, the output can be annotated, and its accuracy computed by the SME. If output 720 is deemed to have insufficient accuracy, SME-validated output 740a can be re-submitted to then system as input 740b to train the system. If output 720 is deemed to have acceptable levels of accuracy, the output 720 is used as model metadata 730 for fine-tuning of the system.

Thus, as described herein, once the data has been extracted from the original rule, the system is configured to convert the data to the selected standardized target format. The system is capable of handling simple rules (i.e., no multiple rows, no loop conditions), intermediate rules (i.e., simple rules with multiple versions, versioning or expiry rules, no loop conditions), as well as complex rules (i.e., has loop conditions, and/or multiple variables being checked (multiple operators)). The proposed systems have been used across a variety of rule types and shown to offer powerful accuracy. The below table presents performance metrics of one embodiment of the proposed system:

| Rule Type | Rule Count | Accuracy |
|---|---|---|
| IRL (IBM ODM) | 8000 | 85% |
| DRL(Drools) | 2500 | 78% |
| DRL(Decision table) | 1500 | 75% |
| SBVR | 1200 | 83% |
| .Net (XAML) | 2000 | 71% |

Figure 8:
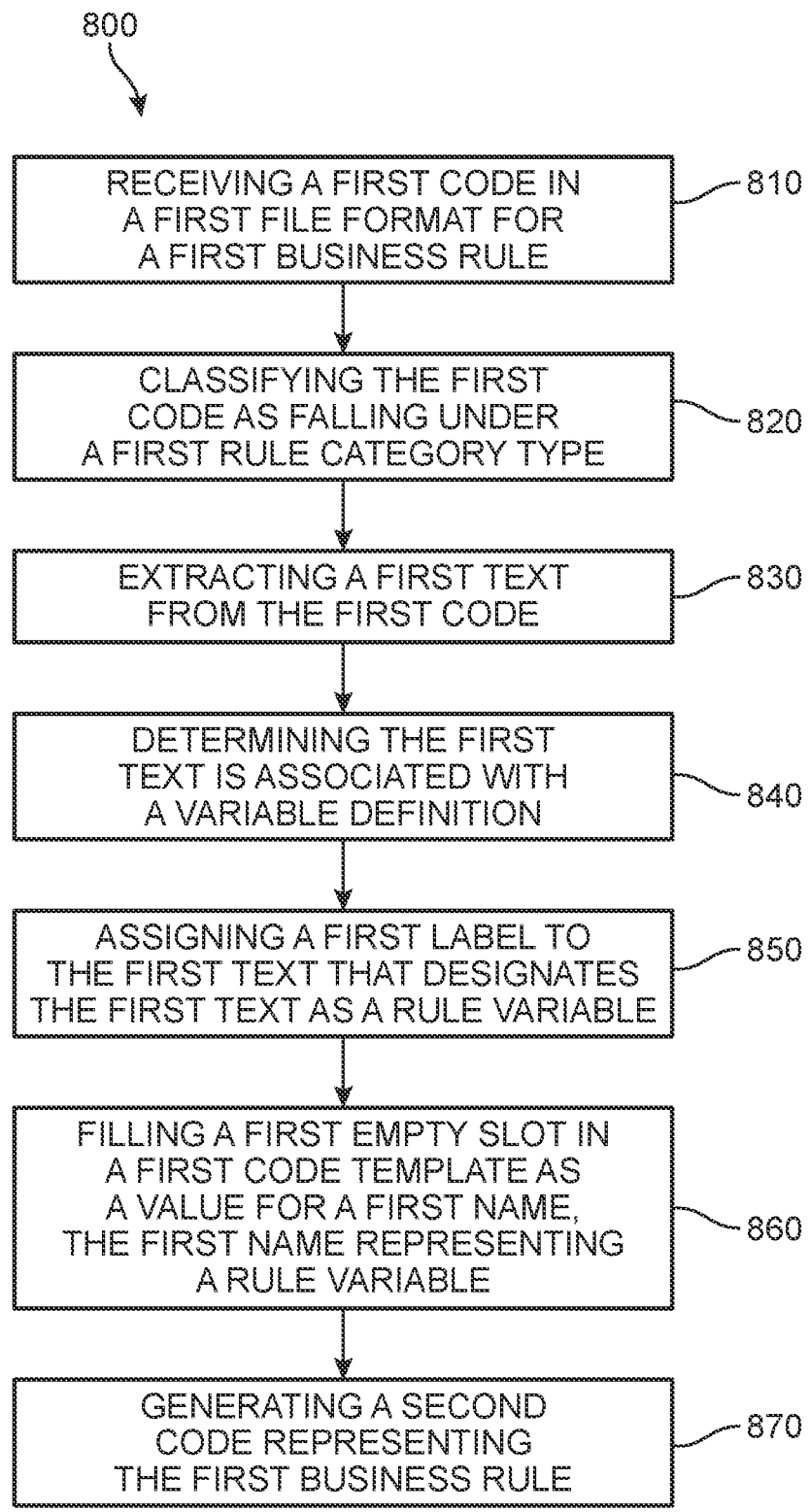
FIG. 8 is a flow chart depicting a method of translating decision logic to facilitate migration between BRM (business rules management) systems, according to an embodiment.

FIG. 8 is a flow chart illustrating an embodiment of a computer implemented method of translating decision or other business logic to facilitate migration between BRM (business rules management) systems 800 (or method 800). The method 800 includes a first step 810 of receiving, at a rules translation system, a first code in a first file format representing a first business rule. A second step 820 includes classifying, at the rules translation system and using decision or other business logic, the first code as falling under a first rule category type, and a third step 830 includes extracting, at the rules translation system, a first text from the first code. In addition, the method 800 includes a fourth step 840 of determining, at the rules translation system, the first text is associated with a variable definition, and a fifth step 850 of assigning, at the rules translation system, a first label to the first text that designates the first text as a rule variable. Furthermore, the method 800 includes a sixth step 860 of filling, via the rules translation system, a first empty slot in a first code template, the first empty slot corresponding to a value for a first name, the first name representing a rule variable, and a seventh step 870 of generating, using the filled first code template, a second code representing the first business rule, the second code being in a second file format that differs from the first file format. In general, the code templates are pre-generated to allow for a common format or standard rule structure. This template includes the information necessary to extract any data for migration.

Figure 9:
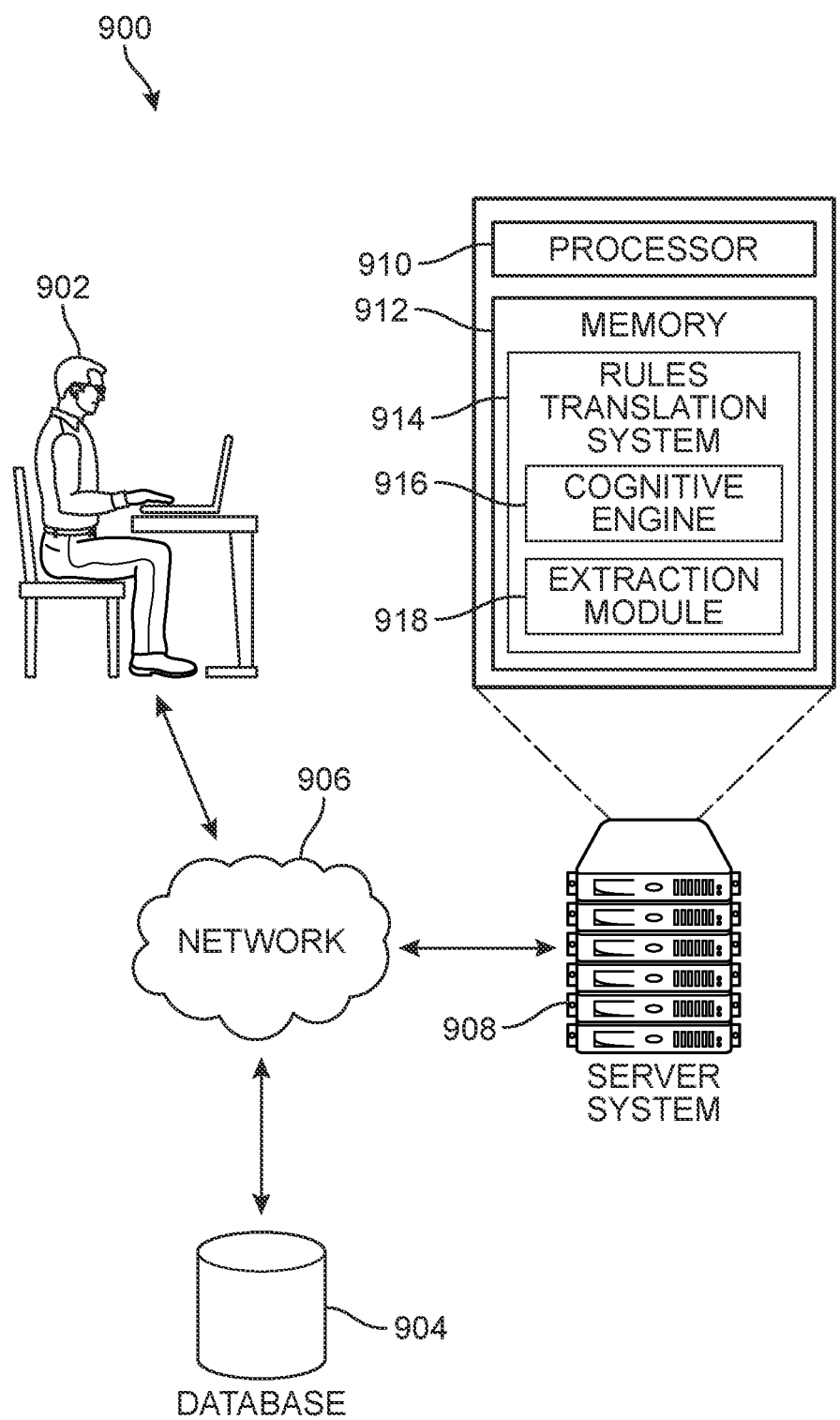
FIG. 9 is a diagram depicting example environments and components by which systems and/or methods, described herein, may be implemented.

In other embodiments, the method may include additional steps or aspects. In one example, the first rule category type is one of JAVA, .Net, IRL, DRL, and SBVR. In another example, the second file format is one of JSON, XML, JavaScript, and Excel. In some embodiments, the method also includes detecting in the first code, by the rules translation system, first business vocabulary, the first business vocabulary being used to identify the first text. In one embodiment, the rules translation system further includes a rules extraction module, and the rules extraction module is configured to extract text from the first code that corresponds to one of rule structure, variable definition, condition structure, expression, and rule data. In another embodiment, the rules translation system further includes a cognitive engine, and the cognitive engine is used to parse text from the first code. In some embodiments, classifying the first code further comprises performing dialect extraction using decision or other business logic to extract a feature value. In one example, the first code is extracted from a first application that is implemented by a first BRMS, and the method further comprises using the second code to perform the first business rule as part of a second application implemented by a second BRMS FIG. 9 is a schematic diagram of an environment 900 for a rules translation system 914 (or system 914), according to an embodiment. The environment 900 may include a plurality of components capable of performing the disclosed method of content validation (e.g., method 800 above). For example, environment 900 includes a user device 902, a computing/server system 908, and a database 904. The components of environment 900 can communicate with each other through a network 906. For example, user device 902 may retrieve information from database 904 via network 906. In some embodiments, network 906 may be a wide area network ("WAN"), e.g., the Internet. In other embodiments, network 906 may be a local area network ("LAN").

As shown in FIG. 9, components of the system 914 may be hosted in computing system 908, which may have a memory 912 and a processor 910. Processor 910 may include a single device processor located on a single device, or it may include multiple device processors located on one or more physical devices. Memory 912 may include any type of storage, which may be physically located on one physical device, or on multiple physical devices. In some cases, computing system 908 may comprise one or more servers that are used to host the automation system.

While FIG. 9 shows one user device, it is understood that one or more user devices may be used. For example, in some embodiments, the system may include two or three user devices. In some embodiments, the user device may be a computing device used by a user. For example, user device 902 may include a smartphone or a tablet computer. In other examples, user device 902 may include a laptop computer, a desktop computer, and/or another type of computing device. The user devices may be used for inputting, processing, and displaying information. Referring to FIG. 9, environment 900 may further include database 904, which stores test data, training data, and/or other related data for automation system as well as external data. This data may be retrieved by other components for system 914. As discussed above, system 914 may include a cognitive engine 916, and a rule extraction module 918. Each of these components may be used to perform the operations described herein.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus can include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment 900, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

An "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition to the algorithms and techniques described above, one or more of the following techniques may be utilized by one or more of the disclosed embodiments: robotic process automation (RPA), Mongo DB, AI Modules such as Python, Image to Text, Optical Character Recognition (OCR), Computer Vision, Image comparison (phase comparison), Image Validation (image to text, then text to text comparison), Learning Algorithms, Similarity Analytics, Sequencing algorithms, Random Forest, gCNN, Data Clustering with weighted data, Data Visualization, Rocket Chat, and D3JS.

For purposes of the current description, the terms "organization," "client," "organization resources," or "client resources" refer to database resources (i.e., data, metadata, programs, and other resources) that are maintained in a central multi-tenant database for access by users who have appropriate access privileges. Such resources can generally be managed by a server and data storage system maintained by a platform provider, as opposed to computers within the actual client (tenant) businesses themselves. In addition, a Cloud Service Provider (CSP) may include an organization that provides a cloud computing resource to a client device and/or a user of a client device. Furthermore, the term "component" refers to software applications and other system modules and features comprising or supporting the multi-tenant architecture.

In one implementation, the translation systems described herein include hardware data storage. Among other operational data, the hardware data storage may store instantiation rules and instantiation metadata. Instantiation circuitry interprets the requirement syntax and executes the instantiation rules with input from the instantiation metadata to issue infrastructure instantiation requests to cause instantiation of the resources requested by the developers. Further, state file unification circuitry facilitates developer collaboration by receiving and managing state files for the individual developer projects. In addition, in some embodiments, the translation systems described herein includes a validation circuitry. The validation circuitry helps to ensure that the instantiation requests that the translation systems described herein makes to the infrastructure providers are completed correctly, cause the expected infrastructure results, and that the infrastructure remains correct over time. To that end, the validation circuitry issues validation requests to the infrastructure providers. The infrastructure providers return Integrity Check Value (ICV) messages to the translation systems described herein. Examples of ICV messages include responses to validation requests, responses to instantiation requests, and infrastructure status messages.

The instantiation circuitry, state file unification circuitry, validation circuitry, requests, and other features of the translation systems described herein improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that can operate properly in serverless function environments. The improved functioning of the underlying computer hardware itself achieves further technical benefits. For example, the translation systems described herein avoids lack of automation, reduces manual intervention, reduces the possibility for human error, and therefore increases infrastructure instantiation efficiency and reduces wait times for correct resource setup and execution. In addition, the translation systems described herein provides additional abstraction, so that developers need not be complete experts in complex laC syntaxes. The developers may instead concentrate on the particular goals of their projects with less time and energy spent on mastering intricate laC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of translating decision logic to facilitate migration between BRM (business rules management) software systems, the method comprising:
    receiving, at a rules translation system, a first code in a first file format representing a first business rule;
    extracting, at the rules translation system, a rule text from the first code;
    parsing, using semantic analysis, the rule text into elemental parts that include at least a first vocabulary term;
    qenerating a first ruleset that corresponds to the first code by classifying, via a T5 or BERT classifier model, the first vocabulary term under one of a rule name, rule global constant, rule variable, rule object, rule text, rule loop, rule number, rule salience, rule expression, rule condition, and rule consequence;
    filling, via the rules translation system, an empty first slot in a first data file with the first vocabulary term based on its classification, thereby re-formatting the first code into a standardized presentation that is migration-ready; and
    generating, using the filled first data file, a second code also representing the first business rule, the second code being in a second file format that differs from the first file format.

2. The method of claim 1, wherein the first file format is one of JAVA, .Net, IRL, DRL, and SBVR.

3. The method of claim 1, wherein the second file format is one of JSON, XML, JavaScript, and Excel.

4. The method of claim 1, further comprising detecting in the first code, by the rules translation system, first business vocabulary, the first business vocabulary being used to identify the rule text.

5. The method of claim 1, wherein the rule text includes text that corresponds to one of a rule structure, variable definition, condition structure, expression, and rule data, in the first code.

6. The method of claim 1, wherein the rules translation system includes a cognitive engine, and the cognitive engine is used to parse text from the first code.

7. The method of claim 1, further comprising performing dialect extraction using decision logic to extract a feature value.

8. The method of claim 1, wherein the first code is extracted from a first application that is implemented by a first BRMS, and the method further comprises using the second code to perform the first business rule as part of a second application implemented by a second BRMS.

9. A non-transitory computer-readable medium storing software comprising instructions executable by one or more computers which, upon such execution, cause the one or more computers to:
    receive, at a rules translation system, a first code in a first file format representing a first business rule;
    extract, at the rules translation system, a rule text from the first code;
    parse, using semantic analysis, the rule text into elemental parts that include at least a first vocabulary term;
    generate a first ruleset that corresponds to the first code by classifying, via a T5 or BERT classifier model, the first vocabulary term under one of a rule name, rule global constant, rule variable, rule object, rule text, rule loop, rule number, rule salience, rule expression, rule condition, and rule consequence;
    fill, via the rules translation system, an empty first slot in a first data file with the first vocabulary term based on its classification, thereby re-formatting the first code into a standardized presentation that is migration-ready; and
    generate, using the filled first data file, a second code also representing the first business rule, the second code being in a second file format that differs from the first file format.

10. The non-transitory computer-readable medium storing software of claim 9, wherein the first file format is one of JAVA, .Net, IRL, DRL, and SBVR.

11. The non-transitory computer-readable medium storing software of claim 9, wherein the second file format is one of JSON, XML, JavaScript, and Excel.

12. The non-transitory computer-readable medium storing software of claim 9, wherein the instructions further cause the one or more computers to detect in the first code, by the rules translation system, first business vocabulary, the first business vocabulary being used to identify the rule text.

13. The non-transitory computer-readable medium storing software of claim 9, wherein the rule text includes text that corresponds to one of a rule structure, variable definition, condition structure, expression, and rule data, in the first code.

14. The non-transitory computer-readable medium storing software of claim 9, wherein the rules translation system includes a cognitive engine, and the cognitive engine is used to parse text from the first code.

15. A system for translating decision logic to facilitate migration between BRM (business rules management) software systems, comprising one or more computers and one or more storage devices storing instructions that are operable, when executed by the one or more computers, to cause the one or more computers to:

receive, at a rules translation system, a first code in a first file format representing a first business rule;

extract, at the rules translation system, a rule text from the first code;

parse, using semantic analysis, the rule text into elemental parts that include at least a first vocabulary term;

generate a first ruleset that corresponds to the first code by classifying, via a T5 or BERT classifier model, the first vocabulary term under one of a rule name, rule global constant, rule variable, rule object, rule text, rule loop, rule number, rule salience, rule expression, rule condition, and rule consequence;

fill, via the rules translation system, an empty first slot in a first data file with the first vocabulary term based on its classification, thereby re-formatting the first code into a standardized presentation that is migration-ready; and generate, using the filled first data file, a second code also representing the first business rule, the second code being in a second file format that differs from the first file format.

16. The system of claim 15, wherein the first file format is one of JAVA, .Net, IRL, DRL, and SBVR.

17. The system of claim 15, wherein the second file format is one of JSON, XML, JavaScript, and Excel.

18. The system of claim 15, wherein the instructions further cause the one or more computers to detect in the first code, by the rules translation system, first business vocabulary, the first business vocabulary being used to identify the rule text.

19. The system of claim 15, wherein the instructions further cause the one or more computers to perform dialect extraction using decision logic to extract a feature value.

20. The system of claim 15, wherein the first code is extracted from a first application that is implemented by a first BRM system, and the instructions further cause the one or more computers to use the second code to perform the first business rule as part of a second application implemented by a second BRM system.

* * * * *